(12) United States Patent
Hinoki et al.

(10) Patent No.: US 7,046,503 B2
(45) Date of Patent: May 16, 2006

(54) ELECTRODE FOR CAPACITOR

(75) Inventors: Kiyonori Hinoki, Tokyo (JP); Yousuke Miyaki, Tokyo (JP); Kazuo Katai, Tokyo (JP); Katsuo Naoi, Tokyo (JP); Eiji Horigome, Tokyo (JP); Yuukichi Morita, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/016,809

(22) Filed: Dec. 21, 2004

(65) Prior Publication Data

US 2005/0207096 A1    Sep. 22, 2005

(30) Foreign Application Priority Data

Dec. 26, 2003   (JP)   ............................. 2003-433406

(51) Int. Cl.
*H01G 9/00* (2006.01)

(52) U.S. Cl. ...................... 361/502; 361/504; 361/508; 361/509; 361/510; 361/512

(58) Field of Classification Search ........ 361/502–503, 361/504, 508, 512, 509, 523, 528
See application file for complete search history.

(56) References Cited

U.S. PATENT DOCUMENTS

| | | | |
|---|---|---|---|
| 5,099,398 A * | 3/1992 | Kurabayashi et al. | 361/502 |
| 6,072,693 A * | 6/2000 | Tsushima et al. | 361/502 |
| 6,134,760 A * | 10/2000 | Mushiake et al. | 361/502 |
| 6,631,073 B1 * | 10/2003 | Sakata et al. | 361/502 |
| 6,912,116 B1 * | 6/2005 | Takahashi et al. | 361/502 |
| 2001/0044045 A1 | 11/2001 | Sato et al. | |

FOREIGN PATENT DOCUMENTS

| | | |
|---|---|---|
| JP | 7-216330 | 8/1995 |
| JP | 11-238654 | 8/1999 |
| JP | 2000-208373 | 7/2000 |
| JP | 2001-284184 | 10/2001 |
| JP | 2001-307716 | 11/2001 |
| JP | 2002-50546 | 2/2002 |
| JP | 2002-75805 | 3/2002 |

OTHER PUBLICATIONS

U.S. Appl. No. 11/016,855, filed Dec. 21, 2004, Hinoki et al.
U.S. Appl. No. 11/016,985, filed Dec. 21, 2004, Hinoki et al.
U.S. Appl. No. 11/016,809, filed Dec. 21, 2004, Hinoki et al.

* cited by examiner

*Primary Examiner*—Nguyen T. Ha
(74) *Attorney, Agent, or Firm*—Oblon, Spivak, McClelland, Maier & Neustadt, P.C.

(57) ABSTRACT

The present invention provides an electrode for an electric double layer capacitor which enhances an adhesive property between an electrode layer and an etched aluminum foil current collector. An electrode for a capacitor, includes a current collector, an undercoat layer on the current collector, and an electrode layer on the undercoat layer, wherein the current collector is made of an aluminum foil; the undercoat layer includes at least electrically conductive particles (P) and a binder (B) in a weight ratio P/B of 0.25 to 2.33, and the binder (B) includes a fluorine-containing polymer as a main component; and the electrode layer includes at least a carbon material and a binder.

4 Claims, No Drawings

ELECTRODE FOR CAPACITOR

BACKGROUND OF THE INVENTION

1. Field of the Invention

The present invention relates to an electrode for an electric double layer capacitor.

2. Disclosure of the Related Art

Electrochemical capacitors, a typical example of which is an electric double layer capacitor, are expected, for example, as backups for power sources of portable devices (small-sized electric devices) and others, auxiliary power sources for electric automobiles or hybrid automobiles, and the like. Various investigations for improving the performance of the capacitors have been made.

As portable devices and others have been becoming smaller and lighter in recent years, it has been particularly required to make an electric double layer capacitor smaller and lighter while the capacitor keeps sufficient performances required for devices on which the capacitor is to be mounted. In other words, an improvement in energy density per unit mass of an electric double layer capacitor, and an improvement in energy density per unit volume thereof have been required. Consequently, electrodes used in the electric double layer capacitor have been required to be made smaller and lighter.

As the electrodes, which are used in electric double layer capacitors, there are known electrodes fabricated by making fibrous activated carbon in a felt form and then vapor-depositing or bonding a current collector made of aluminum or the like to one side of the felt-form activated carbon, electrodes fabricated by kneading granular activated carbon together with a binder such as tetrafluoroethylene or the like, forming the kneaded material into a sheet form, and vapor-depositing or bonding a current collector to one side of the sheet, and other electrodes.

However, in the above-described conventional electrodes, which are fabricated by vapor-depositing or bonding a current collector to activated carbon formed in a felt or sheet form, physical adhesiveness between the activated carbon and the current collector is insufficient, and a decrease in the internal resistance is also insufficient. Additionally, there is a limit to an improvement in electrode characteristics. It is therefore difficult to make the electrodes smaller and lighter while the electrode characteristics are sufficiently maintained.

There is also suggested, for example, a tabular electrode fabricated by forming a kneaded product composed of a binder and a porous material such as activated carbon into a sheet form so as to yield a polarizable electrode (electrode layer), and then bonding the resultant electrode to a current collector through an intermediate layer composed of carbon black and a binder. In the electrode, the adhesiveness between the electrode layer and the current collector is improved and the contact resistance therebetween is decreased (see, for example, Japanese Laid-Open Patent Publication No. 2000-208373, Japanese Laid-Open Patent Publication No. 2001-284184, Japanese Laid-Open Patent Publication No. 2002-75805, and Japanese Laid-Open Patent Publication No. 2002-50546).

However, in each of the above-mentioned publications, an electrode layer is beforehand formed in a sheet form, and this sheet-form electrode layer is bonded to a current collector through an intermediate layer to fabricate an electrode. It is therefore necessary that the electrode layer has a thickness satisfying a mechanical strength for maintaining the shape of the sheet. Thus, it is difficult to make the thickness of the electrode layer smaller.

And, Japanese Laid-Open Patent Publication No. 11-238654 (1999) discloses a process of joining an electrode made mainly of a carbonous material to a surface of a current collector through an electrically conductive adhesive agent comprising, as a binder component, an epoxy resin containing an aliphatic epoxide as a reactive diluting agent, and then heating and curing the adhesive agent to fabricate an electrode. The used adhesive agent is thermosetting.

SUMMARY OF THE INVENTION

Thus, the present inventors have eagerly repeated research in order to make an electrode layer thinner and make an electrode smaller and lighter. As a result, the present inventors have found out that an electrode having a thinned electrode layer can be obtained by: forming an undercoat layer comprising electrically conductive particles and a binder on a current collector by coating, and then forming an electrode layer comprising a carbon material and a binder on the undercoat layer by coating.

As the current collector, a good conductor capable of transferring charges sufficiently through the undercoat layer into the electrode layer, for example, a metal foil made of aluminum or the like may be used. Among the aluminum foils, an etched aluminum foil which is subjected to etching is preferably used. However, the etched aluminum foil has a large number of irregularities in its etching-treated surface. Thus, it is further desired to improve the adhesiveness between the electrode layer and the current collector through the undercoat layer.

An object of the present invention is to provide an electrode for an electric double layer capacitor which is considerably excellent in adhesive property between an electrode layer and an etched aluminum foil current collector.

The present inventors have made further research so as to find out that an electrode, which is considerably excellent in adhesive property between an electrode layer and an etched aluminum foil current collector, can be obtained by using a fluorine-containing polymer as a binder in an undercoat layer and setting the blend ratio between electrically conductive particles and the binder in the undercoat layer into a specific range.

The present invention encompasses the following inventions.

(1) An electrode for a capacitor, which comprises a current collector, an undercoat layer on the current collector, and an electrode layer on the undercoat layer, wherein the current collector is made of an aluminum foil;

the undercoat layer comprises at least electrically conductive particles (P) and a binder (B) in a weight ratio P/B of 0.25 to 2.33, and the binder (B) comprises a fluorine-containing polymer as a main component; and the electrode layer comprises at least a carbon material and a binder.

(2) The electrode for a capacitor according to the above (1), wherein the thickness of the undercoat layer is from 0.2 μm to 10 μm.

(3) The electrode for a capacitor according to the above (1) or (2), wherein the binder comprised in the electrode layer comprises a fluorine-containing polymer as a main component.

(4) The electrode for capacitor according to any one of the above (1) to (3), wherein the undercoat layer is formed by applying an undercoat layer coating material which comprises at least the electrically conductive particles (P), the binder (B) and a solvent onto the current collector, the weight ratio P/B of the electrically conductive particles (P) to the binder (B) in the undercoat layer coating material is from 0.25 to 2.33 in the undercoat layer coating material, and the binder (B) comprises a fluorine-containing polymer as a main component; and the electrode layer is formed by applying an electrode layer coating material which comprises at least the carbon material, the binder and a solvent onto the undercoat layer.

According to the present invention, provided is an electrode for an electric double layer capacitor which is considerably excellent in adhesive property between an electrode layer and an etched aluminum foil current collector.

DETAILED DESCRIPTION OF THE INVENTION

The electrode for an electric double layer capacitor fabricated in the present invention is composed mainly of a current collector, an undercoat layer on the current collector, and an electrode layer on the undercoat layer. A lead, which is used as an electrode connecting terminal, is usually formed at an end of the current collector.

In the present invention, it is preferred to use an etched aluminum foil as the current collector. The etched aluminum foil has a large number of irregularities in its etching-treated surface. The number or size of the irregularities in the etching-treated surface is varied by the etching treatment. The thickness of the current collector is preferably from 20 to 50 µm, more preferably from 20 to 30 µm from the viewpoint of a decrease in the size and the weight of the electrode.

The undercoat layer is arranged between the current collector and the electrode layer, and causes the current collector and the electrode layer to adhere physically and electrically to each other. The undercoat layer comprises, as constituents thereof, at least electrically conductive particles (P) and a binder (B) capable of bonding/adhering to the electrically conductive particles.

The electrically conductive particles (P) are not limited to any especial kind if the particles have electron conductivity making it possible to advance the transfer of charges sufficiently between the current collector and the electrode layer. The particles (P) may be, for example, particles made of a carbon material having electron conductivity. The carbon material may be carbon black or graphite from the viewpoint of the electron conductivity thereof. About the carbon material particles, the lattice plane spacing ($d_{002}$) thereof is preferably from 0.335 to 0.338 nm and the thickness of each of crystallites ($Lc_{002}$) thereof is preferably from 50 to 80 nm, which are determined by X-ray diffraction analysis, from the viewpoint of the electron conductivity.

Examples of the carbon black include acetylene black, Ketjen black, channel black, furnace black, thermal black, and others. Of these, acetylene black is preferable. The average particle diameter of the carbon black is preferably from 25 to 50 nm, and the BET specific surface area thereof is preferably 50 $m^2/g$ or more, more preferably from 50 to 140 $m^2/g$. The use of such carbon black makes it possible to give excellent electron conductivity to the undercoat layer so as to decrease the internal resistance of the electrode.

Examples of the graphite include natural graphite, artificial graphite, expanded graphite, and others. Of these, artificial graphite is preferable. The average particle diameter of the graphite is preferably from 4 to 6 µm, and the BET specific surface area thereof is preferably 10 $m^2/g$ or more, more preferably from 15 to 30 $m^2/g$. The use of such graphite makes it possible to give excellent electron conductivity to the undercoat layer so as to decrease the internal resistance of the electrode.

As the carbon material, only one out of the above-mentioned carbon blacks and graphites may be used, or two or more out of them may be used in combination.

In the present invention, a fluorine-containing polymer is used as a main component of the binder (B) of the undercoat layer, and specifically, in an amount range of 80 to 100% by weight of the total of the binder (B). The fluorine-containing polymer is not specifically limited and may be any fluorine-containing polymer capable of bonding/adhering to the electrically conductive particles. Examples thereof include fluororubber, and fluorocarbon resins such as polytetrafluoroethylene (PTFE) and polyvinylidene fluoride (PVDF). Of these, fluororubber is preferable.

Examples of the fluororubber include vinylidene fluoride-hexafluoropropylene (VDF-HFP) copolymer, vinylidene fluoride-hexafluoropropylene-tetrafluoroethylene (VDF-HFP-TFE) copolymer, vinylidene fluoride-pentafluoropropylene (VDF-PFP) copolymer, vinylidene fluoride-pentafluoropropylene-tetrafluoroethylene (VDF-PFP-TFE) copolymer, vinylidene fluoride-perfluoromethyl vinyl ether-tetrafluoroethylene (VDF-PFMVE-TFE) copolymer, vinylidene fluoride-chlorotrifluoroethylene (VDF-CTFE) copolymer, ethylene-tetrafluoroethylene copolymer, propylene-tetrafluoroethylene copolymer, and the like. Of these, fluororubbers wherein two selected from the group consisting of VDF, HFP and TFE are copolymerized are preferable, and VDF-HFP-TFE copolymer is particularly preferable in respect to improvement of the adhesive property between the current collector and the electrode layer and improvement of the chemical resistance.

As the binder(s) (B), only one out of the above-mentioned fluorine-containing polymers may be used, or two or more out of them may be used in combination. A known binder, such as polyethylene, polypropylene or the like, may be used as an optional component of the binder (B) in an amount of 20% by weight or less of the total of the binders (B).

In the present invention, the blend ratio P/B of the electrically conductive particles (P) to the binder (B) in the undercoat layer, which is denoted as the weight ratio P/B, is from 0.25 to 2.33. When the blend ratio is set into this specific range, there can be obtained an undercoat layer which does not hinder the transfer of charges between the etched aluminum foil current collector and the electrode layer and which has a sufficient adhesiveness to the etched aluminum foil, which has surface irregularities. This would be for the following reasons: the surface irregularities of the etched aluminum foil is moderately smoothed by the binder so that the adhesiveness is improved, and contact between the electrically conductive particles and the etched aluminum foil surface is also kept. If P/B is less than 0.25, the amount of the binder is too large against the electrically conductive particles so that the transfer of charges between the current collector and the electrode layer is hindered. On the other hand, if P/B exceeds 2.33, the amount of the binder is too small against the electrically conductive particles so that the adhesiveness between the undercoat layer and the etched aluminum foil becomes insufficient. The blend ratio P/B of the electrically conductive particles (P) to the binder (B) is varied by the degree of the irregularities on the etching-treated surface of the current collector, the specific surface area of the electrically conductive particles, and others, and is preferably from 0.43 to 1.00.

The undercoat layer is formed by applying an undercoat layer coating material which comprises the electrically conductive particles (P), the binder (B), and a solvent onto the current collector. The blend ratio P/B of the electrically conductive particles (P) to the binder (B) in the undercoat layer coating material, which is denoted as the weight ratio P/B, is from 0.25 to 2.33, preferably from 0.43 to 1.00.

The solvent used in the coating material for undercoat layer is not specifically limited and may be any solvent wherein the binder can be dissolved, and an ordinary organic solvent may be used. Specific examples of the organic solvent include saturated hydrocarbons such as hexane; aromatic hydrocarbons such as toluene and xylene; alcohols such as methanol, ethanol, propanol, and butanol; ketones such as acetone, methyl ethyl ketone (MEK), methyl isobutyl ketone (MIBK), and diisobutyl ketone; esters such as ethyl acetate and butyl acetate; ethers such as tetrahydrofuran, dioxane, and diethyl ether; amides such as N,N-dimethylformamide, N-methylpyrrolidone, and N,N-dimethylacetamide; and halogenated hydrocarbons such as ethylene chloride, and chlorobenzene. Of these, ketone type and amide type solvents are preferable since the fluororubber can be dissolved therein. These solvents may be used alone or in a mixture of two or more thereof.

The amount of the solvent in the coating material for undercoat layer is preferably from about 600 to 2,000 parts by weight for 100 parts by weight of the total of the electrically conductive particles (P) and the binder (B). The amount of the solvent is appropriately decided, considering the applicability of the coating material, and other factors.

In the preparation of the coating material for undercoat layer, the electrically conductive particles, the binder and the solvent are first mixed or kneaded in a usual manner to yield a slurry. The mixing or kneading can be performed by use of, for example, a roll mill, a planetary mixer, an open kneader, a continuous kneader, or a pressure kneader.

Next, the resultant slurry is preferably subjected to dispersing treatment. By dispersing treatment, a uniformly dispersed coating material for undercoat layer can be obtained. It is preferred to use a dispersing medium at the time of the dispersing treatment, and it is preferred to use ceramic beads as the dispersing medium. Examples of the ceramic beads include zirconia ($ZrO_2$) beads, alumina ($Al_2O_3$) beads, titania ($TiO_2$) beads, and the like. The use of the zirconia beads, which have a high specific gravity, is preferable from the viewpoint of an improvement in dispersion efficiency. The particle diameter of the ceramic beads is preferably from about 0.1 to 1.0 mm, more preferably from 0.1 to 0.8 mm in order to improve the dispersion property. As the particle diameter of the beads is smaller, more fine (more satisfactory) dispersion can be conducted. However, if the particle diameter of the beads is too small, the mass of each of the beads gets too small so that the collision energy thereof is reduced. Thus, the dispersion property tends to deteriorate. If the particle diameter of the beads is smaller than 0.1 mm, the effect of improving the dispersion property is not obtained very much, and moreover, if the beads are worn away by the use in a dispersing machine for a long time so that the particle diameter becomes small, it is feared that the beads held in the machine leak out from the screen, mesh, gaps or the like of the machine so as to be mixed with the coating material. On the other hand, if the particle diameter of the beads is larger than 1.0 mm, it is necessary to conduct dispersion for a long time. Thus, the workability is liable to deteriorate.

When glass beads are used for the dispersing treatment, the beads are worn away so that sodium ions therefrom are incorporated into the coating material. When steel beads are used, the beads are worn away so that the metal is incorporated into the coating material. The incorporation is not preferred because the effect of self-discharge (short-circuit) is produced. For this reason, the ceramic beads are used in the present invention.

It is advisable to use, as the dispersing machine, for example, a sand grinder mill, a pin mill, an attritor, or a ball mill. The retention time of the slurry in the dispersing machine is preferably from about 0.1 to 60 minutes, more preferably from 1 to 5 minutes. If the retention time is less than 0.1 minute, the dispersing treatment gets insufficient so that a sufficient adhesive property of the undercoat layer is not easily obtained. On the other hand, sufficient dispersing treatment can be conducted for a retention time of 60 minutes; therefore, a retention time exceeding 60 minutes is unnecessary. Herein, the retention time is defined by the following equation.

Retention time=(Empty volume [L] of vessel of dispersing machine/Volume [L] of slurry)×Dispersing time The filling ratio of the beads is preferably set into a range of 60 to 85% by weight. The bead filling ratio is defined by the following equation.

Bead filling ratio (% by weight)=[Bead mass [g]]/(Empty volume [L] of vessel of dispersing machine×Bead density [g/L×0.6)]×100

If the bead filling ratio is less than 60% by weight, the dispersing treatment tends to get insufficient so as to decrease the dispersing efficiency. If the bead filling ratio exceeds 85% by weight, the beads are excessively filled into the dispersing machine so that rotary parts of the machine are not easily rotated. Consequently, loads are liable to be applied to the parts so as to generate heat easily.

Such dispersing treatment of the slurry with the ceramic beads permits the preparation of a coating material for undercoat layer in a good dispersion state without agglomerate.

The prepared coating material for undercoat layer is applied onto a current collector, and then dried.

The application of the coating material for undercoat layer onto the current collector can be performed by an ordinary well-known coating method, examples of which include reverse roll method, direct roll method, blade method, knife method, extrusion nozzle method, curtain method, gravure roll method, bar coat method, dip method, kiss coat method, and squeeze method. A good surface state of the coating layer can be obtained by selecting the solvent composition of the coating material and drying conditions thereof in such a manner that the coating material is applied at a coating speed of 5 to 100 m/minute while the current collector is traveled.

The drying temperature is preferably from 50 to 150° C., more preferably from 70 to 140° C. If the drying temperature is less than 50° C., the solvent is insufficiently dried. If the drying temperature exceeds 150° C., the evaporation rate of the solvent gets too high so that the surface state of the undercoat layer may deteriorate. The thickness of the undercoat layer is preferably set into a range of about 0.2 to 10 μm from the viewpoint of a decrease in the size and the weight of the electrode and from the viewpoint of good electric conductivity between the current collector and the electrode layer.

The electrode layer is a layer which is formed on the undercoat layer and contributes to electric charge and discharge. This layer comprises, at constituents thereof, at least a carbon material having electric conductivity and a binder capable of bonding/adhering to the carbon material.

The carbon material is not specifically limited and may be any carbon material having electric conductivity. Examples thereof include granular or fibrous activated carbon, which is subjected to activating treatment. The average particle diameter of the carbon material is preferably from 3 to 20 µm, and the BET specific surface area thereof is preferably 1,500 $m^2/g$ or more, more preferably from 2,000 to 2,500 $m^2/g$. By the use of such a carbon material, the electrostatic capacity of the electrode can be made high.

The binder in the electrode layer is not specifically limited and may be any binder capable of bonding/adhering to the carbon material, and is preferably fluorine-containing polymer used as the binder (B) in the undercoat layer. In other words, the binder in the electrode layer is preferably any fluorine-containing polymer selected from the same fluororubbers and fluorocarbon resins as exemplified as the binder (B) in the undercoat layer. Of these, the fluororubbers are preferable. Examples of the fluororubbers include the same fluororubbers as exemplified as the binder (B) in the undercoat layer. Of the fluororubbers, fluororubbers wherein two selected from the group consisting of VDF, HFP and TFE are copolymerized are preferable, and VDF-HFP-TFE copolymer is particularly preferable in respect to improvement of the adhesive property to the undercoat layer and improvement of the chemical resistance. The binders for the electrode layer may be used alone or in combination of two or more thereof. When the same binder as used in the undercoat layer is used in the electrode layer, the adhesive property between the electrode layer and the undercoat layer is further improved. As the binder in the electrode layer, polyethylene (PE), polypropylene (PP) or the like besides the above may be used.

The amount of the binder incorporated into the electrode layer is varied by the specific surface area of the carbon material, the strength of the target electrode and others, and is preferably from 5 to 20% by weight, more preferably from 8 to 15% by weight of the dried electrode coating layer (the carbon material+the binder+an optional electrically conductive auxiliary, which will be described below). As the binder has a higher binding/adhering performance to the carbon material, the amount of the incorporated binder may be smaller.

If necessary, an electrically conductive auxiliary is used in the electrode layer. The electrically conductive auxiliary is used to help the transfer of charges between the electrode layer and the current collector. The electrically conductive auxiliary is not specifically limited and may be any material having electron conductivity. Examples thereof include carbon materials such as carbon black and graphite, which have been described as the electrically conductive particles in the undercoat layer. As the electrically conductive auxiliary, acetylene black having the above-mentioned average particle diameter and BET specific surface area are preferable from the viewpoint of high electron conductivity. The amount of the electrically conductive auxiliary incorporated into the electrode layer is preferably from 0.5 to 2.0% by weight of the dried electrode coating layer.

The electrode layer is formed by applying an electrode layer coating material which comprises the carbon material, the binder, the optional electrically conductive auxiliary, and a solvent onto the undercoat layer.

The solvent used in the coating material for electrode layer is not specifically limited and may be any solvent wherein the binder can be dissolved, and an ordinary organic solvent may be used. Examples of the organic solvent include the same organic solvents as exemplified as the organic solvent in the coating material for undercoat layer. Ketone type and amide type solvents are preferable since the fluororubber can be dissolved therein. These solvents may be used alone or in a mixture of two or more thereof.

The amount of the solvent in the coating material for electrode layer is preferably set into a range of about 200 to 400 parts by weight for 100 parts by weight of the total of the carbon material, the binder and the optional electrically conductive auxiliary. The amount of the solvent is appropriately decided, considering the applicability of the coating material, and other factors.

In the preparation of the coating material for electrode layer, the carbon material, the binder and the solvent are first mixed or kneaded in a usual manner to yield a slurry. The mixing or kneading can be performed by use of, for example, a roll mill, a planetary mixer, an open kneader, a continuous kneader, or a pressure kneader.

Next, the resultant slurry is preferably subjected to dispersing treatment. By dispersing treatment, a uniformly dispersed coating material for electrode layer can be obtained. It is preferred to use a dispersing medium at the time of the dispersing treatment, and it is preferred to use, as the dispersing medium, ceramic beads for the same reasons as described about the preparation of the coating material for undercoat layer. Examples of the ceramic beads include zirconia ($ZrO_2$) beads, alumina ($Al_2O_3$) beads, titania ($TiO_2$) beads, and the like. The use of the zirconia beads, which have a high specific gravity, is preferable from the viewpoint of an improvement in dispersion efficiency. The particle diameter of the ceramic beads is preferably from about 0.3 to 1.5 mm, more preferably from about 0.3 to 0.8 mm. If the particle diameter of the beads is smaller than 0.3 mm, the effect the effect of improving the dispersion property is not obtained very much. If the particle diameter of the beads is larger than 1.5 mm, it is necessary to conduct dispersion for a long time. Thus, the workability is liable to deteriorate.

It is advisable to use, as the dispersing machine, for example, a sand grinder mill, a pin mill, an attritor, or a ball mill. In the case that no dispersing medium is used, an ultrasonic dispersing machine or a collision (impact) dispersing machine such as a homogenizer may be used.

The retention time of the slurry in the dispersing machine is preferably from about 0.1 to 10 minutes, more preferably from 0.15 to 5 minutes. If the retention time is less than 0.1 minute, the dispersing treatment gets insufficient so that the strainer of the machine may be clogged. On the other hand, sufficient dispersing treatment can be conducted for a retention time of 10 minutes; therefore, a retention time exceeding 10 minutes is unnecessary. Herein, the retention time is defined by the above-mentioned equation.

The filling ratio of the beads, which is defined by the above-mentioned equation, is preferably set into a range of 60 to 85% by weight. If the bead filling ratio is less than 60% by weight, the dispersing treatment tends to get insufficient so as to decrease the dispersing efficiency. If the bead filling ratio exceeds 85% by weight, the beads are excessively filled into the dispersing machine so that rotary parts of the machine are not easily rotated. Consequently, loads are liable to be applied to the parts so as to generate heat easily.

Such dispersing treatment of the slurry with the ceramic beads permits the preparation of a coating material for electrode layer in a good dispersion state without agglomerate.

The prepared coating material for electrode layer is applied onto the undercoat layer, and then dried.

The application of the coating material for electrode layer onto the undercoat layer can be performed by an ordinary well-known coating method, examples of which include reverse roll method, direct roll method, blade method, knife method, extrusion nozzle method, curtain method, gravure roll method, bar coat method, dip method, kiss coat method, and squeeze method. A good surface state of the coating layer can be obtained by selecting the solvent composition of the coating material and drying conditions thereof in such a manner that the coating material is applied at a coating speed of 5 to 100 m/minute while the current collector is traveled.

The drying temperature is preferably from 70 to 200° C., more preferably from 90 to 180° C. If the drying temperature is less than 70° C., the solvent is insufficiently dried. If the drying temperature exceeds 200° C., the evaporation rate of the solvent gets too high so that the surface state of the electrode layer may deteriorate. The time for drying the electrode layer is preferably from 0.1 to 120 minutes, more preferably from 0.5 to 100 minutes.

The thickness of the electrode layer is preferably set into a range of about 50 to 200 μm from the viewpoint of a decrease in the size and the weight of the electrode and from the viewpoint of obtaining a high electrostatic capacity. The thickness of the electrode layer can be also adjusted by subjecting the dried electrode layer to calendering treatment. The calendering treatment is usually conducted with a roll press machine. It is advisable to set the calendering pressure at this time within, e.g., a range of 4,900 to 24,500 N/cm (0.5 to 2.5 t/cm).

EXAMPLES

The present invention will be more specifically described byway of the following examples. However, the present invention is not limited by the examples.

Example 1

(Preparation of Undercoat Layer Coating Material)

40 g of acetylene black (trade name: Denka Black, manufactured by Denki Kagaku Kogyo Kabushiki Kaisha, BET specific surface area: 67 $m^2/g$) as electrically conductive particles (P) and 60 g of a fluororubber (trade name: Viton-GF, manufactured by Du Pont) as a binder (B) were introduced into 186 g of methyl isobutyl ketone (MIBK). The mixture was kneaded for 45 minutes by means of a planetary mixer. 964 g of MIBK was further added to the kneaded product, and then the resultant was stirred for 1 hour to yield a slurry. The resultant slurry was introduced into a sand grinder mill, and then was subjected to dispersing treatment for a retention time of 2 minutes using Zirconia beads (zirconia $ZrO_2$, manufactured by Nikkato Corp., particle diameter: 0.3 mm) as a dispersing medium. At this time, the peripheral velocity of the dispersing machine was set to 10 m/sec, the flow rate was set to 138 g/min (160 mL/min), and the bead filling ratio was set to 80% by weight. In this way, an undercoat layer coating material was prepared. The undercoat layer coating material was kept in a good dispersion state without the generation of any agglomerate.

(Preparation of Electrode Layer Coating Material)

90 g of granular activated carbon (trade name: RP-20, manufactured by Kuraray Chemical Co., Ltd., aspect ratio: about 1.0) and 1 g of acetylene black (trade name: Denka Black, manufactured by Denki Kagaku Kogyo Kabushiki Kaisha, BET specific surface area: 67 $m^2/g$) were mixed for 15 minutes by means of a planetary mixer. 9 g of a fluororubber (trade name: Viton-GF, manufactured by Du Pont), 57 g of MIBK, and 81 g of propylene carbonate were introduced into the whole of the mixture. The mixture was kneaded for 45 minutes by means of a planetary mixer. Furthermore, 132 g of MIBK was added to the kneaded product, and then the resultant was stirred for 1 hour to yield a slurry. The resultant slurry was introduced into a sand grinder mill, and then was subjected to dispersing treatment for a retention time of 10 seconds using Zirconia beads (zirconia $ZrO_2$, manufactured by Nikkato Corp., particle diameter: 0.8 mm) as a dispersing medium. At this time, the peripheral velocity of the dispersing machine was set to 10 m/sec, the flow rate was set to 124 g/min (120 mL/min), and the bead filling ratio was set to 80% by weight. In this way, an electrode layer coating material was prepared. The electrode layer coating material was kept in a good dispersion state without the generation of any agglomerate.

(Fabrication of Electrode)

The above-mentioned undercoat layer coating material was uniformly applied onto one surface of an etched aluminum foil (trade name: 30CB, manufactured by JCC Co., thickness: 30 μm) as a current collector by gravure roll method. The coating layer was dried in a drying furnace at a temperature of 100° C., so as to form an undercoat layer of 5 μm in thickness.

Next, the above-mentioned electrode layer coating material was uniformly applied onto the undercoat layer by gravure roll method. The coating layer was dried in a drying furnace at a temperature of 120° C., so as to form an electrode layer of 175 μm in thickness. In this way, a raw electrode (electrode sheet) was obtained.

The resultant raw electrode was subjected to calendering treatment at a pressure of 9,800 N/cm (1 t/cm) with a roll press machine having a pair of metallic press rolls each having a diameter of 350 mm. In this way, an electrode layer of 120 μm in thickness was formed on the current collector, so as to yield an electrode.

The resultant electrode was cut into a rectangle (30 mm×56 mm), and further dried in a vacuum at a temperature of 180° C. for 60 hours to remove water content and the solvent adsorbed on the electrode layer and the undercoat layer. In this way, an electrode for electric double layer capacitor was fabricated. In order to fabricate an electric double layer capacitor, two electrodes, which were fabricated as above, were prepared for an anode and a cathode.

Examples 2 to 5 and Comparative Examples 2 to 3

Each electrode for electric double layer capacitor was fabricated in the same way as in Example 1 except that the amounts of the acetylene black and the fluororubber in the preparation of the undercoat layer coating material were each changed as shown in Table 1.

(Fabrication of Electric Double Layer Capacitor)

The anode electrode and the cathode electrode obtained in each of the Examples and the Comparative Examples were used to fabricate an electric double layer capacitor as follows.

First, a lead (width: 2 mm, length: 10 mm) made of aluminum foil was arranged at an outer edge portion of the current collector surface of each of the fabricated anode and cathode, no electrode layer being formed on or over this surface. Next, the anode, a separator and the cathode were overlapped in this order and in a contact (and non-joined) state, so as to form a laminate (raw body). The used separator was a separator (trade name: TF4050, manufactured by Nippon Kodoshi Corp., size: 31×57 mm, thickness: 0.05 mm) made of regenerated cellulose nonwoven fabric.

As the material of a case of a capacitor, a flexible composite wrapping film wherein an inner layer made of a modified polypropylene, a metal layer made of aluminum foil, and an outer layer made of a polyamide were successively laminated in this order was used. The composite wrapping film made into a predetermined rectangular form was folded in two at the middles of the long sides in such a manner that the modified polypropylene inner layer would be positioned inwards. The overlapped side edge portions to each other of the long sides were subjected to heat sealing so as to form a bag wherein the short side edges were open. The laminate (raw body) was put into the bag in such a manner that the leads were projected from the bag. Subsequently, an electrolyte solution was poured into the bag under a reduced pressure, and then the short side edge portions were sealed under a reduced pressure to yield an electric double layer capacitor.

The used electrolyte solution was a 1.2 mol/L solution of triethylmethylammonium borofluoride in propylene carbonate.

(Electrode Peel Test)

A charging/discharging tester (HJ-101SM6, manufactured by Hokuto Denko Corp.) was used to apply a voltage of 2.5 V to an electric double layer capacitor at a temperature of 60° C. so as to continue CC-CV charging (constant current-constant voltage charging) at a current density of 5 mA/F for 24 hours, and then the capacitor was discharged till the voltage turned into 0 V at 5 mA/F. Thereafter, the capacitor was disassembled to check whether or not the peeling of the electrodes was occurred. This electrode peel test was made about 10 samples of each of the above-mentioned capacitors. Any sample wherein peeling was occurred in only one of the anode and the cathode was determined as a sample wherein peeling was occurred. As the test results, the number of samples wherein peeling was occurred out of the 10 samples is shown in Table 1.

(Internal Resistance)

The internal resistance of each of the electric double layer capacitors was measured by the following procedures. The charging/discharging tester (HJ-101SM6, manufactured by Hokuto Denko Corp.) was used to apply a voltage of 2.5 V to the electric double layer capacitor at a temperature of 60° C. so as to continue CC-CV charging (constant current-constant voltage charging) at a current density of 5 mA/F for 24 hours, and then the capacitor was discharged till the voltage turned into 0 V at 5 mA/F. Thereafter, a device (SOLARTRON, manufactured by Toyo Technica Corp.) was used to measure the resistance value of the capacitor at 1 kHz as the internal resistance ($\Omega \cdot cm^2$) thereof. The measurement of the internal resistance was made at a temperature of 25° C. and a relative humidity of 60%. Any sample having an internal resistance of 3.0 $\Omega \cdot cm^2$ or more was determined to be unacceptable. The capacitor of Comparative Example 3 had a high internal resistance because of the influence of peeling. Table 1 shows the results.

It is evident from Table 1 that no electrode peeling was observed in the electrodes obtained in Examples 1 to 5 of the present invention and the adhesive property between their electrode layer and etched aluminum foil current collector was considerably excellent.

TABLE 1

| Electrode | Comparative Example 3 | Example 5 | Example 4 | Example 1 | Example 2 | Example 3 | Comparative Example 1 | Comparative Example 2 |
|---|---|---|---|---|---|---|---|---|
| Weight ratio of P/B | 4.0 | 2.33 | 1.0 | 0.67 | 0.43 | 0.25 | 0.11 | 0 |
| Acetylene black (g) | 80 | 70 | 50 | 40 | 30 | 20 | 10 | 0 |
| Fluororubber (g) | 20 | 30 | 50 | 60 | 70 | 80 | 90 | 100 |
| Electrode peel test (The number of samples where peeling was occurred)/10 | 10/10 | 0/10 | 0/10 | 0/10 | 0/10 | 0/10 | 0/10 | 0/10 |
| Internal resistance ($\Omega \cdot cm^2$) | 32.3 | 2.6 | 2.3 | 2.3 | 2.3 | 2.7 | 3.0 | 15.5 |

What is claimed is:

1. An electrode for a capacitor, which comprises a current collector, an undercoat layer on the current collector, and an electrode layer on the undercoat layer, wherein
    the current collector is made of an aluminum foil;
    the undercoat layer comprises at least electrically conductive particles (P) and a binder (B) in a weight ratio P/B of 0.25 to 2.33, and the binder (B) comprises a fluorine-containing polymer as a main component; and
    the electrode layer comprises at least a carbon material and a binder.

2. The electrode for a capacitor according to claim 1, wherein the thickness of the undercoat layer is from 0.2 μm to 10 μm.

3. The electrode for a capacitor according to claim 1, wherein the binder comprised in the electrode layer comprises a fluorine-containing polymer as a main component.

4. The electrode for capacitor according to claim 1, wherein the undercoat layer is formed by applying an undercoat layer coating material which comprises at least the electrically conductive particles (P), the binder (B) and a solvent onto the current collector, the weight ratio P/B of the electrically conductive particles (P) to the binder (B) in the undercoat layer coating material is from 0.25 to 2.33 in the undercoat layer coating material, and the binder (B) comprises a fluorine-containing polymer as a main component; and
    the electrode layer is formed by applying an electrode layer coating material which comprises at least the carbon material, the binder and a solvent onto the undercoat layer.

* * * * *